(12) United States Patent
Koszewnik

(10) Patent No.: US 11,113,000 B2
(45) Date of Patent: Sep. 7, 2021

(54) TECHNIQUES FOR EFFICIENTLY ACCESSING VALUES SPANNING SLABS OF MEMORY

(71) Applicant: NETFLIX, INC., Los Gatos, CA (US)

(72) Inventor: John Andrew Koszewnik, Morgan Hill, CA (US)

(73) Assignee: NETFLIX, INC., Los Gatos, CA (US)

( * ) Notice: Subject to any disclaimer, the term of this patent is extended or adjusted under 35 U.S.C. 154(b) by 107 days.

(21) Appl. No.: 16/540,020

(22) Filed: Aug. 13, 2019

(65) Prior Publication Data

US 2019/0369922 A1    Dec. 5, 2019

Related U.S. Application Data

(63) Continuation of application No. 15/820,407, filed on Nov. 21, 2017, now Pat. No. 10,387,077.

(60) Provisional application No. 62/425,767, filed on Nov. 23, 2016, provisional application No. 62/428,640, filed on Dec. 1, 2016, provisional application No. 62/432,048, filed on Dec. 9, 2016.

(51) Int. Cl.
*G06F 3/06* (2006.01)
*G06F 12/00* (2006.01)
*G06F 13/14* (2006.01)

(52) U.S. Cl.
CPC .......... *G06F 3/0659* (2013.01); *G06F 3/0604* (2013.01); *G06F 3/0631* (2013.01); *G06F 3/0673* (2013.01); *G06F 12/00* (2013.01); *G06F 13/14* (2013.01)

(58) Field of Classification Search
CPC .............................. G06F 3/0659; G06F 12/00
USPC .......................................................... 711/105
See application file for complete search history.

(56) References Cited

U.S. PATENT DOCUMENTS

| | | |
|---|---|---|
| 6,973,493 B1 | 12/2005 | Slaughter et al. |
| 2003/0033134 A1 | 2/2003 | Sandham |
| 2003/0191916 A1* | 10/2003 | McBrearty .......... G06F 11/1464 |
| | | 711/162 |
| 2006/0112222 A1 | 5/2006 | Barrall |
| 2014/0019710 A1* | 1/2014 | Kataoka .................. G06F 7/768 |
| | | 711/202 |

* cited by examiner

*Primary Examiner* — Jae U Yu
(74) *Attorney, Agent, or Firm* — Artegis Law Group, LLP

(57) ABSTRACT

In various embodiments, a memory pool application implements composite arrays via a memory pool that includes a first slab and a second slab. First, the memory pool application assigns the first slab and the second slab to a composite array. The memory pool application then modifies a final data word included in the first slab to store a first portion of a specified value and a leading data word included in the second slab to store a second portion of the specified value. The memory pool application copies the second data word to a duplicate data word included in the first slab. Subsequently, the memory pool application performs an unaligned read operation on the first slab based on a specified offset to retrieve a first word stored in memory and extracts the specified value from the first word based on the specified offset and a specified number of bits.

20 Claims, 5 Drawing Sheets

TECHNIQUES FOR EFFICIENTLY ACCESSING VALUES SPANNING SLABS OF MEMORY

CROSS-REFERENCE TO RELATED APPLICATIONS

This application is a continuation of the U.S. Provisional patent application titled, "TECHNIQUES FOR EFFICIENTLY ACCESSING VALUES SPANNING SLABS OF MEMORY," filed on Nov. 21, 2017 and having Ser. No. 15/820,407, which claims priority benefit of the U.S. Provisional patent application titled, "ADDITIONAL TECHNIQUES FOR MANAGING SMALL TO MODERATELY SIZED DATASETS," filed on Nov. 23, 2016 and having Ser. No. 62/425,767, and also claims priority benefit of the U.S. Provisional Patent Application titled, "ADDITIONAL TECHNIQUES FOR MANAGING SMALL TO MODERATELY SIZED DATASETS," filed on Dec. 1, 2016 and having Ser. No. 62/428,640, and also claims priority benefit of the U.S. Provisional Patent Application titled, "ADDITIONAL TECHNIQUES FOR MANAGING SMALL TO MODERATELY SIZED DATASETS," filed Dec. 9, 2016 and having Ser. No. 62/432,048. The subject matter of these related applications is hereby incorporated herein by reference.

BACKGROUND OF THE INVENTION

Field of the Invention

Embodiments of the present invention relate generally to data processing and, more specifically, to techniques for efficiently accessing values spanning slabs of memory.

Description of the Related Art

In many systems, various applications executing on servers include in those systems perform read-only memory operations on one or more datasets when providing services to end-users. For example, in a typical video distribution system, there is a stored dataset that includes metadata describing various characteristics of the videos. Such characteristics include, without limitation, title, genre, synopsis, cast, maturity rating, release date, and the like. An application included in the video distribution system can be configured to perform correlation operations on the dataset to recommend videos to end-users. The same or another application included in the video distribution system can perform various access operations on the dataset in order to display information associated with a selected video to end-users.

To reduce the time required for applications to respond to different requests for information from end-users, some systems include a dataset application that stores a copy of one or more datasets in local random access memory (RAM) and then periodically updates the copies of those datasets in response to various operations. One limitation of storing datasets in RAM is that the heap memory dynamically allocated to store the datasets may be subsequently reclaimed during garbage collection operations. These reclaiming operations may reduce the ability of the applications executing on the servers to respond to end-user requests.

More specifically, a typical application dynamically allocates dataset objects that store values included in the dataset. In the heap memory associated with a generational garbage collector, the various dataset objects initially reside in a new generation space. However, the dataset objects are typically retained long enough to be promoted to a tenured generation space before those dataset objects are no longer used. As persons skilled in the art will recognize, promoting non-permanent objects to a tenured generation space may result in frequent, full, and/or major garbage collections that degrade the performance of the servers.

In particular, when a generational garbage collector collects memory associated with non-permanent objects that reside in the tenured generation space, the associated server typically experiences various spikes in processor utilization and latency. As a result of the spikes, applications executing on the server may experience operational pauses. During each operational pause, all requests that are in progress stop and wait for the garbage collection to complete. Consequently, the time required for one or more applications to respond to end-user requests may increase to unacceptable levels.

As the foregoing illustrates, what is needed in the art are more effective techniques for implementing and managing datasets in computing environments.

SUMMARY OF THE INVENTION

One embodiment of the present invention sets forth a method for accessing values stored in memory. The memory comprises assigning a first slab and a second slab to a composite array, where the first slab and the second slab are associated with a memory pool; modifying a final data word included in the first slab to store a first portion of a specified value; modifying a leading data word included in the second slab to store a second portion of the specified value; performing a copy operation that copies the leading word to a duplicate word included in the first slab; performing a first unaligned read operation on the first slab based on a specified offset to retrieve a first word stored in memory; and extracting the specified value from the first word based on a specified number of bits and the specified offset.

One advantage of the disclosed techniques is that, by storing values in reusable slabs via pooled arrays, some applications can mitigate operational pauses attributable to garbage collection of memory residing in a tenured generation space. More specifically, after a composite array is no longer in use, the slabs assigned to the composite array are still associated with the memory pool, are not reclaimed via garbage collection, and may subsequently be reassigned to one or more new composite arrays.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

In sum, the disclosed techniques may be used to efficiently implement datasets in computing environments that include generational garbage collectors. A system includes, without limitation, a memory pool application and a dataset application that execute on a server. As part of an initialization process, the memory pool application allocates multiple slabs and includes references to each of the slabs in a memory pool. Notably, for each slab, the memory pool application allocates a fixed number of data words and then appends a duplicate word. Subsequently, the dataset application interfaces with the memory pool application via a memory pool application programming interface (API) to generate and operate on any number of poolable arrays included in the dataset.

To generate a poolable array of a specified size, the dataset application moves references to slabs included in the memory pool to the poolable array based on the specified size and the number of data words included in each slab. After a given poolable array is no longer in use, the dataset application returns the references to the slabs included in the poolable array to the memory pool. Subsequently, as part of storing a value, if the memory pool application modifies the leading data word included in a non-leading slab, then the memory pool application copies the leading data word to the duplicate word of the preceding slab. Because each slab includes a duplicate word, the memory pool application can retrieve a value that straddles two data words included in different slabs via a single unaligned read operation.

One advantage of the disclosed techniques is that by storing a dataset in poolable arrays, a dataset application may efficiently reuse the heap memory, thereby mitigating operational pauses attributable to garbage collection of the heap memory that may reduce the ability of applications to respond to end-user requests. Further the duplicate words ensure that latencies typically experienced while performing read-only operations on a value stored across two data words in different slabs are similar to latencies typically experienced, while performing read-only operations on a value stored, in a single data word.

System Overview

Figure 1:
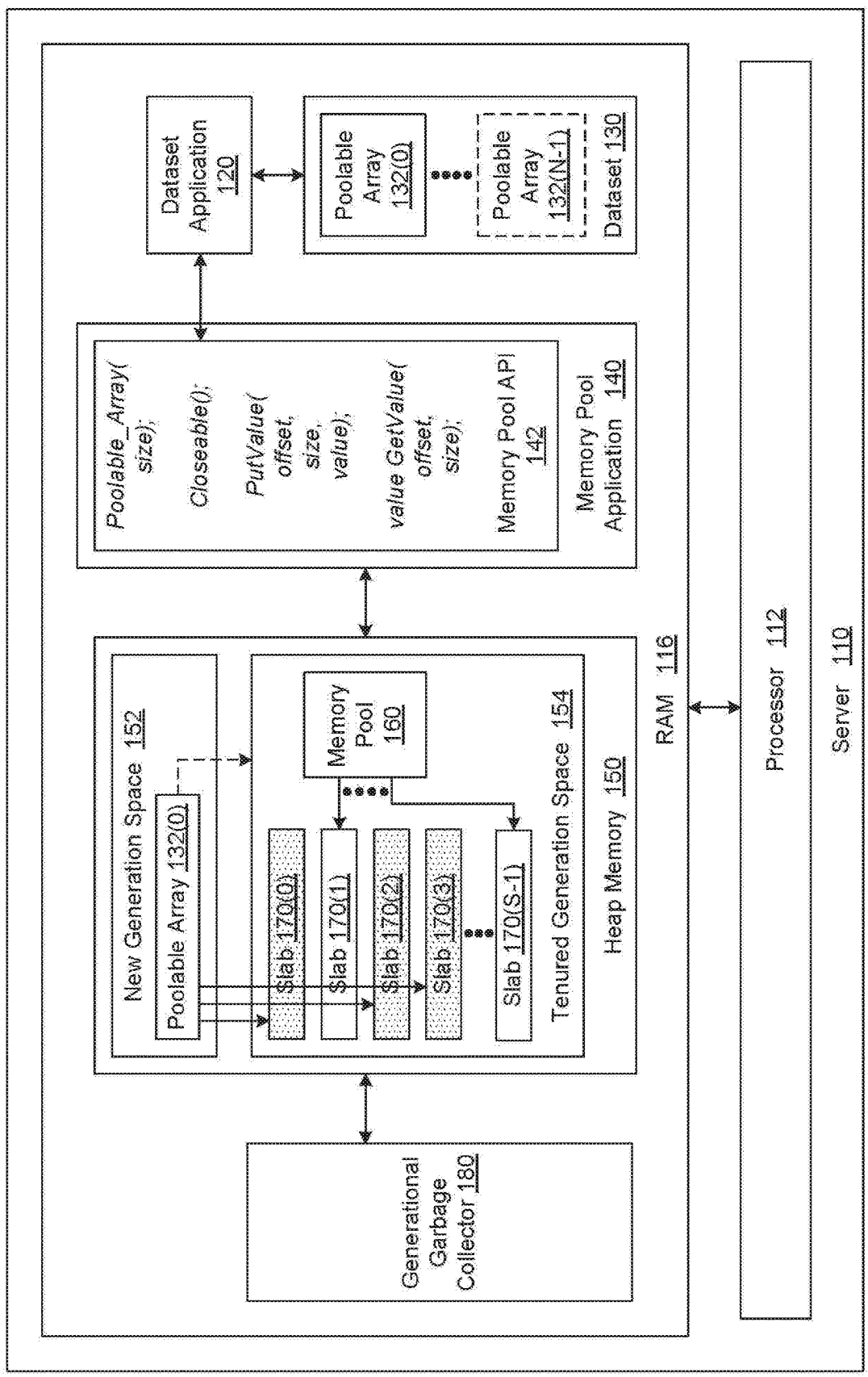
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a server 110 that includes, without limitation, a processor 112 and a random access memory (RAM)116. For explanatory purposes, multiple instances of like objects are denoted with reference numbers identifying the object and parenthetical numbers identifying the instance where needed.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The RAM 116 stores content, such as software applications and data, for use by the processor 112. The RAM 116 may be implemented in any technically feasible fashion.

In some embodiments, additional types of memory (not shown) may supplement the RAM 116. The additional types of memory may include additional RAMs, read only memory (ROM), floppy disk, hard disk, or any other form of digital storage, local or remote. In the same or other embodiments, a storage (not shown) may supplement the RAM 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

As shown, the RAM 116 includes, without limitation, a heap memory 150 and a generational garbage collector 180. The heap memory 150 is a portion of the RAM 116 where dynamically allocated memory resides. Typically, an operating system (not shown) allocates memory from a new generation space 152 portion of the heap memory 150 when an object is initially created. If the object is retained in the heap memory 150 for a sufficiently long period of time and/or the object survives one or more garbage collections, then the object is eventually "promoted" (i.e., moved) to a tenured generation space 154 portion of the heap memory 152. In general, the size of the new generation space 152 is significantly smaller than the size of the tenured generation space 154.

The generational garbage collector 180 is an automatic garbage collector that reclaims the heap memory 150 allocated to objects that are no longer in use by the applications executing on the server 110. As persons skilled in the art will recognize, while reclaiming the heap memory 150 facilitates memory reuse, the time required to perform garbage collections may adversely impact the performance of the server 110. In particular, applications executing on the processor 112 can experience increased latencies and decreased throughputs while the generational garbage collector 180 is reclaiming the heap memory 150.

In general, various applications executing on the server 110 perform read-only memory operations on one or more datasets 130 when providing services to end-users. For instance, in some embodiments, the dataset 130 may include metadata describing various characteristics of videos. Such characteristics include, without limitation, title, genre, synopsis, cast, maturity rating, release date, and the like. An application included in the system 100 may be configured to perform correlation operations on the dataset 130 to recommend videos to end-users. The same or another application included in the system 100 may perform various access operations on the dataset 130 in order to display information associated with a selected video to end-users.

To reduce the time required for applications to respond to different requests for information from end-users, some conventional systems include a conventional dataset application that stores a copy of one or more conventional datasets in local random access memory (RAM) and then periodically updates the copies of those conventional datasets in response to various operations. One limitation of storing conventional datasets in RAM is that the heap memory dynamically allocated to store the conventional datasets may be subsequently reclaimed during garbage collection operations. These reclaiming operations may reduce the ability of the applications executing on the servers to respond to end-user requests.

More specifically, a typical conventional application dynamically allocates dataset objects that store values included in the conventional dataset. In the heap memory associated with a generational garbage collector, the various dataset objects initially reside in a new generation space. However, the dataset objects are typically retained long enough to be promoted to a tenured generation space before those dataset objects are no longer used. As persons skilled in the art will recognize, promoting non-permanent objects to a tenured generation space may result in frequent, full, and/or major garbage collections that degrade the performance of the servers.

In particular, when a generational garbage collector collects memory associated with non-permanent objects that reside in the tenured generation space, the associated server typically experiences various spikes in processor utilization and latency. As a result of the spikes, applications executing on the server may experience operational pauses. During each operational pause, all requests that are in progress stop and wait for the garbage collection to complete. Consequently, the time required for one or more conventional applications to respond to end-user requests may increase to unacceptable levels.

Generating Poolable Arrays of Fixed-Sized Slabs

While the limitations above are described in conjunction with a conventional dataset, similar limitations exist in many types of systems that implement conventional techniques to dynamically allocate objects associated with read dominated workloads. Together, a memory pool application 140 and a dataset application 120 mitigate the limitations associated with conventional techniques for these types of systems. In alternate embodiments, the functionality of the memory pool application 140 and/or the dataset application 120 may be integrated into any number of applications and the dataset 130 may be replaced by any number and type of dynamically allocated objects associated with the applications.

For explanatory purposes only, the memory pool application 140 and the dataset application 120 are depicted as residing in the RAM 116 of a single server 110 and executing on a processor 112 of the single server 110. However, as persons skilled in the art will recognize, the functionality of the memory pool application 140 and the dataset application 120 may be distributed across any number of other applications and/or subsystems of applications that reside in any number of RAMs 116 and execute on any number of processors 112 in any combination. Further, the functionality of any number of applications, including the memory pool application 140 and the dataset application 120, may be consolidated into a single application.

In general, the memory pool application 140 generates and operates on any number of poolable arrays 132. The poolable array 132 is also referred to herein as the "composite array." Each poolable array 132 comprises an ordered array of different slab references and each slab reference is a reference to a slab 170. During an initialization phase, the memory pool application 140 generates S slabs 170, where each of the slabs 170 includes, without limitation, D different data words (not shown in FIG. 1) and a different duplicate word (not shown in FIG. 1). Each of the slabs 170 has the same size as the other slabs 170, each of the data words has the same size as the other data words included in the same and other slabs 170, and each of the duplicate words has the same size as the data words.

The memory pool application 140 may determine the number and size of the slabs 170 and the number and size of the data words included in each of the slabs 170 in any technically feasible fashion. For example, the memory pool application 140 could determine the number and size of the slabs 170 and the number and size of the data words via a user interface or based on a characteristic of the server 110 size of the heap memory 150).

In general, the size of the data words is equal to the size of a word in the architecture of the processor 112. For example, if the processor 112 comprises a 64-bit processor, then the size of the data words is equal to 64 bits. Further, to enable the memory pool application 140 to optimize operations on the slabs 170, the number of data words included in each slab is a power of two. In alternate embodiments, the number of data words included in each of the slabs 170 is not constrained to a power to two and the techniques described herein are modified accordingly.

For each of the slabs 170, the memory pool application 140 assigns a slab reference (not shown in FIG. 1) that references the slab 170 to a memory pool 160 that resides in the heap memory 150. At any given point in time, the slab references included in the memory pool 160 specify the slabs 170 that are not currently included in the poolable arrays 132 and, consequently, are available for inclusion in new poolable arrays 132. Although the slabs 170 and the memory pool 160 initially reside in the new generation space 152, the memory pool application 140 ensures that the slabs 170 and the memory pool 160 are in continuous use (e.g., by maintaining the slab references) and, consequently, are eventually promoted to the tenured generation space 154.

The memory pool application 140 includes, without limitation, a memory pool application interface (API) 142 that enables the dataset application 120 to generate and perform operations on the poolable arrays 132. As shown, the memory pool API 142 includes, without limitation, four interface methods having the method signatures "Poolable_Array(size)," "Closeable( )", PutValue(offset, size value)," and "value GetValue(offset, size)."

The Poolable_Array interface method configures the memory pool application 140 to create a new poolable array 132 having the specified size. To create a new poolable array 132 having a specified size, the memory pool application 140 determines the number of slabs references to include in the poolable array 132 based on the specified size and the number of data words included in each of the slabs 170.

The memory pool application 140 initializes a new poolable array 132 to an empty array and then selects the determined number of slab references from the slab references included in the memory pool 160. For each selected slab reference, the memory pool application 140 removes the slab reference from the memory pool 160 and appends the slab reference to the new poolable array 132. In this fashion, the new poolable array 132 specifies an ordered array of the slabs 170.

For explanatory purposes only, FIG. 1 depicts a point in time at which the memory pool application 140 has finished generating a single poolable array 132(0). The single poolable array 132(0) is included in the dataset 130 and resides in the new generation space 152. As depicted with a dotted line, the poolable array 132(0) may subsequently move to the tenured generation space 154. As depicted with the partially filled boxes, the poolable array 132(0) specifies an ordered array of the slabs 170(0), 170(2), and 170(3). By contrast, as depicted with the unfilled boxes, the memory pool 160 specifies the slabs 170(1) and 170(4)-170(S-1).

In a complementary fashion, the Closeable( ) interface method indicates to the memory pool application 140 that an application is no longer using the associated poolable array 132. In general, when the memory pool application 140 determines that an application is no longer using a given poolable array 132, the memory pool application 140 moves the slab references included in the poolable array 132 from the poolable array 132 to the memory pool 160. Subsequently, the memory pool application 140 may assign any number of the reclaimed slabs 170 to any number of new poolable arrays 132.

As persons skilled in the art will recognize, the slabs 170 and the memory pool 160 enable the memory pool application 140 to generate poolable arrays 132 having a wide range of sizes without leaving inconveniently sized gaps in the heap memory 150. Further, because the slabs 170 are not candidates for garbage collection while the memory pool application 140 is operating, storing, non-permanent values in the slabs 170 does not cause the generational garbage collector to 180 to perform frequent, full, or major garbage collections.

The PutValue interface method configures the memory pool application 140 to store a specified value having a specified size at a specified offset relative to the start of the associated poolable array 132. The specified size is typically expressed as a number of bits and is also referred to herein as the "specified number of bits." Advantageously, to decrease the amount of memory required to store values, the memory pool application 140 stores bit-aligned values having sizes less than or equal to the size of each of the slab words. For example, in a single 64-bit data word, the memory pool application 140 could sequentially store a 22-bit value, a 40-bit value, and 2 bits of a 16-bit value. In the next 64-bit data word, the memory pool application 140 could store the remaining 14 bits of the 16-bit word and a 50-bit word. In additional to allowing values to span multiple data words, the memory pool application 150 allows values to span multiple slabs 170.

To store the specified value, the memory pool application 140 selects the slab 170 included in the associated poolable array 132, the data word within the selected slab 170, and a bit within the selected data word 270 based on the specified offset. Although the poolable array 132 actually comprises slab references, the poolable array 132 is also referred to herein as comprising and/or including the slabs 170. The memory pool application 140 then determines a binary representation of the specified value based on the specified number of bits. The memory pool application 140 performs a read-modify-write operation on the selected data word to write at least a portion of the binary representation of the specified value to the selected data word starting at the selected bit.

The memory pool application 140 then determines whether the selected data word is the leading data word included in a non-leading slab 170 included in the associated poolable array 132. If the selected data word is a leading data word included in a non-leading slab, then the memory pool application 140 copies the selected data word to the duplicate word included in the preceding slab 170. In this fashion, the memory pool application 140 ensures that for all but the final slab 172 included in a given poolable array 132, the duplicate word is a copy of the leading data word included in the following slab 170. As described in greater detail below in conjunction with the GetValue interface method, the duplicate words enable the memory pool application 140 to efficiently read values that span data words included in different slabs 170.

The memory pool application 140 then determines whether the memory pool application 140 has finished writing the specified value to the poolable array 132. If the memory pool application 140 determines that the memory pool application 140 has not finished writing the specified value to the poolable array 132, then the memory pool application 140 determines whether the selected data word is the final data word included in the selected slab 170. If the memory pool application 140 determines that the selected data word is the final data word included in the selected slab 170, then the memory pool application 140 selects the next slab 170 included in the poolable array 132 and the leading data word included in the selected slab 170. If, however, the memory pool application 140 determines that the selected data word is not the final data word included in the selected slab 170, then the memory pool application 140 selects the next data word included in the selected slab 170.

The memory pool application 140 selects the leading bit in the selected data word and performs a second read-modify-write operation that writes the remaining bits of the binary representation to the selected data word starting at the selected bit. Finally, if the selected data word is a leading data word included in a non-leading slab 170, then the memory pool application 140 copies the selected data word to the duplicate word included in the preceding slab 170.

As persons skilled in the art will recognize, the techniques described herein may be implemented and/or modified based on any number of constraints associated with the server 110. An example of pseudo-code that implements the PutValue interface method for a processor 112 that implements a word size of 64 bits and a little-endian architecture is:

```
public void PutValue(long index, int bitsPerElement, long value) {
    long whichLong = index >>> 6;
    int whichBit = (int) (index & 0x3F);
    set(whichLong, get(whichLong) | (value << whichBit));
    /// we may not have written all the bits
    int bitsRemaining = 64 - whichBit;
    if bitsRemaining < bitsPerElement)
        set(whichLong + 1, get(whichLong + 1) |
        (value >>> bitsRemaining));
}
public void set(long index, long value) {
    /// log2OfSegmentSize is a field or constant indicating the log2 of
    /// the number of 64-bit longs in each segment (not including the
    /// duplicate long)
    /// bitmask is a field or constant equal to
    (1 << log2OfSegmentSize) - 1
    int segmentIndex = (int)(index >> log2OfSegmentSize);
    int longInSegment = (int)(index & bitmask);
    long[ ] segment = segments[segmentIndex];
    segment[longInSegment] = value;
    /// duplicate the longs here so that we can read faster.
    if(longInSegment == 0 && segmentIndex != 0) {
        long[ ] priorSegment = segments[segmentIndex - 1];
        priorSegment[1 << log2OfSegmentSize] = value;
    }
}
```

The GetValue interface method configures the memory pool application 140 to retrieve a value having a specified size that is stored at a specified offset relative to the start of the associated poolable array 132. The specified size is typically expressed as a number of bits and is also referred to herein as the "specified number of bits." To retrieve the requested value, the memory pool application 140 selects the slab 170, the data word within the selected slab 170, and the byte within selected data word 270 at which to start an unaligned read operation based on the specified offset. Note that unaligned reads are typically required to start at byte boundaries.

The memory pool application 140 then performs a single unaligned read operation starting at the selected byte to retrieve a word. As described previously herein, the number of bits in the retrieved word typically equals the number of bits in each of the data words. Notably, if the requested value spans two slabs 170(x) and 170(x+1), the unaligned read operation reads one or more bytes from the data word included in the slab 170(x) and one or more bytes from the duplicate word included in the same slab 170(x).

The memory pool application 140 performs a shift operation on the retrieved word based on the specified offset to generate an offset word. Subsequently, the memory pool application 140 performs a mask operation on the offset word based on the specified number of bits to provide the requested value. Advantageously, by performing a single unaligned read to retrieve a word that includes the requested value irrespective of where the requested value is stored within the poolable array 132, the memory pool application 140 optimizes the poolable slabs 132 for read dominated workloads.

As persons skilled in the art will recognize, the techniques described herein may be implemented and/or modified based on any number of constraints associated with the server 110. An example of pseudo-code that implements the GetValue interface method for a processor 112 that implements a word size of 64 bits and a little-endian architecture (e.g., that stores multibyte words in little-endian byte order) is:

```
public long getValue(long index, int bitsPerElement) {
    long mask = ((1L << bitsPerElement) - 1));
    long whichByte = index >>> 3;
    int whichBit = (int) (index & 0x07);
    /// log2OfSegmentSizeInBytes is a field or constant indicating the
    /// log2 of the number of 8-bit bytes in each segment (not including
    /// the duplicate 64-bit long)
    int whichSegment = (int)
    (whichByte >>> log2OfSegmentSizeInBytes);
        long[ ] segment = segments[whichSegment];
        long elementByteOffset =
    (long)Unsafe.ARRAY_LONG_BASE_OFFSET +
    (whichByte & byteBitmask);
    long l = unsafe.getLong(segment, elementByteOffset) >>> whichBit;
    return l & mask;
}
```

Note that the techniques described herein are illustrative rather than restrictive, and may be altered without departing from the broader spirit and scope of the invention. Many modifications and variations on the functionality provided by the system 100, the server 110, the dataset application 120, and the memory pool application 140 will be apparent to those of ordinary skill in the art without departing from the scope and spirit of the described embodiments. For instance, in various embodiments, any number of the techniques or devices may be implemented while other techniques may be omitted or replaced in any technically feasible fashion.

In various embodiments, the structure of the slabs 170, the structure of the memory pool 160, the structure of the poolable arrays 132, and/or the functionality implemented by the memory pool application 140 may be modified to support fewer, greater, or different constraints. For instance, in some embodiments, the functionality of the memory pool application 140 is modified to support processors that implement a big-endian architecture. In the same or other embodiments, the functionality of the memory pool application 140 is modified to support processors that implement words having 32 bits.

Figure 2:
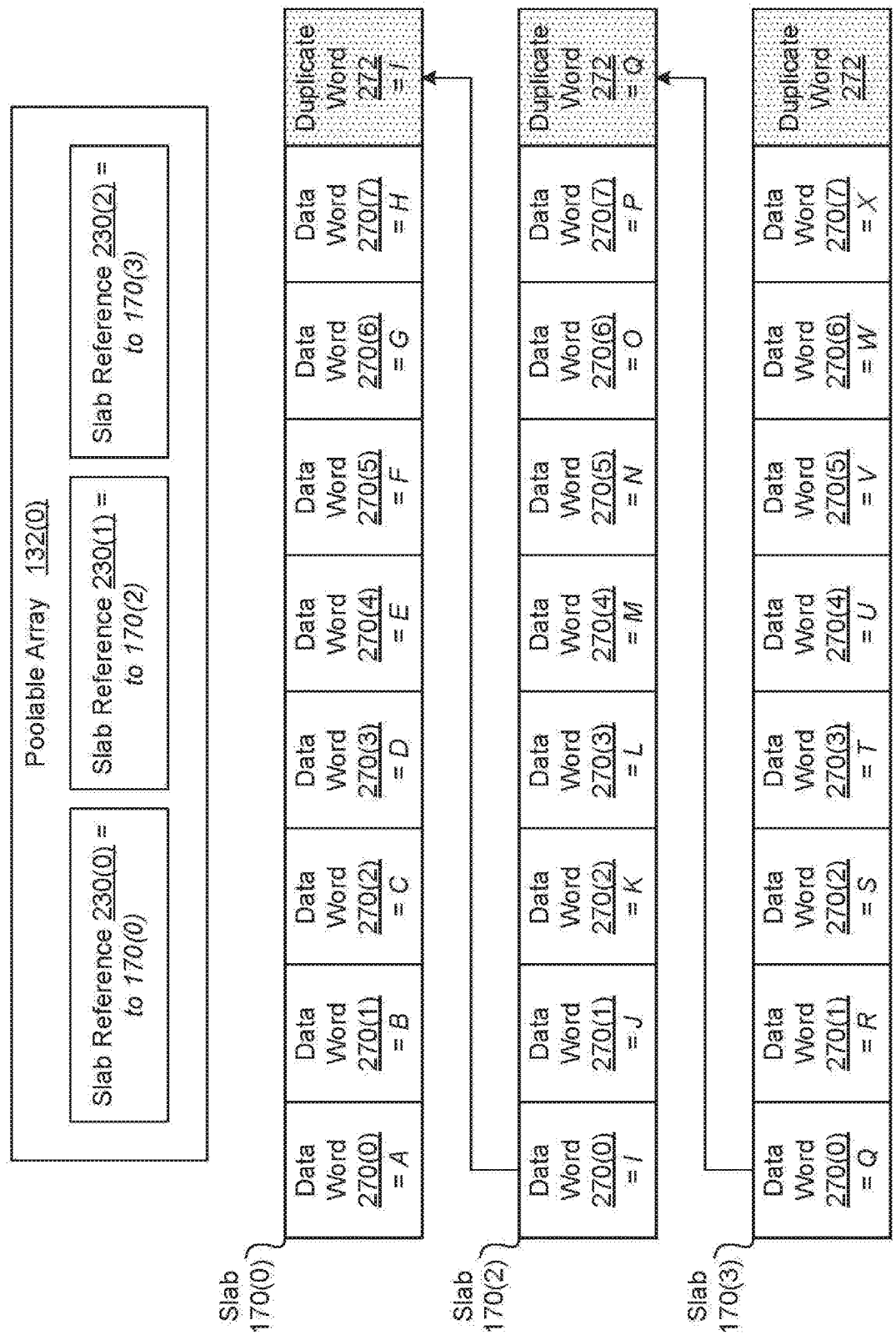
FIG. 2 is a more detailed illustration of the poolable array of FIG. 1, according to various aspects of the present invention.

FIG. 2 is a more detailed illustration of the poolable array 132(0) of FIG. 1, according to various aspects of the present invention. As shown, the poolable array 132(0) includes, without limitation, three slab references 230. The slab reference 230(0) refers to the slab 170(0), the slab reference 230(1) refers to the slab 170(2), and the slab reference 230(2) references to the slab 170(3). Accordingly, with respect to the poolable array 132(0), the slab 170(0) is the leading slab 170 and the slab 170(3) is the final slab.

As shown, each of the slabs 170 includes, without limitation, data words 270(0)-270(7) and a duplicate word 272. For explanatory purposes only, each of the data words 270 includes 8 bits and the processor 110 implement a word size of 8 bits. Consequently, the total number of unique bits that may be stored in each of the slabs 170 is 64, and the total number of unique bits that may be stored in the poolable array 132(0) is 192.

As depicted with arrows, the duplicate word 272 included in the slab 170(0) is a copy of the data word 270(0) included in the slab 170(2), and the duplicate word 272 included in the slab 170(2) is a copy of the data word 270(0) included in the slab 170(3).

Performing Operations on Poolable Arrays

Figure 3:
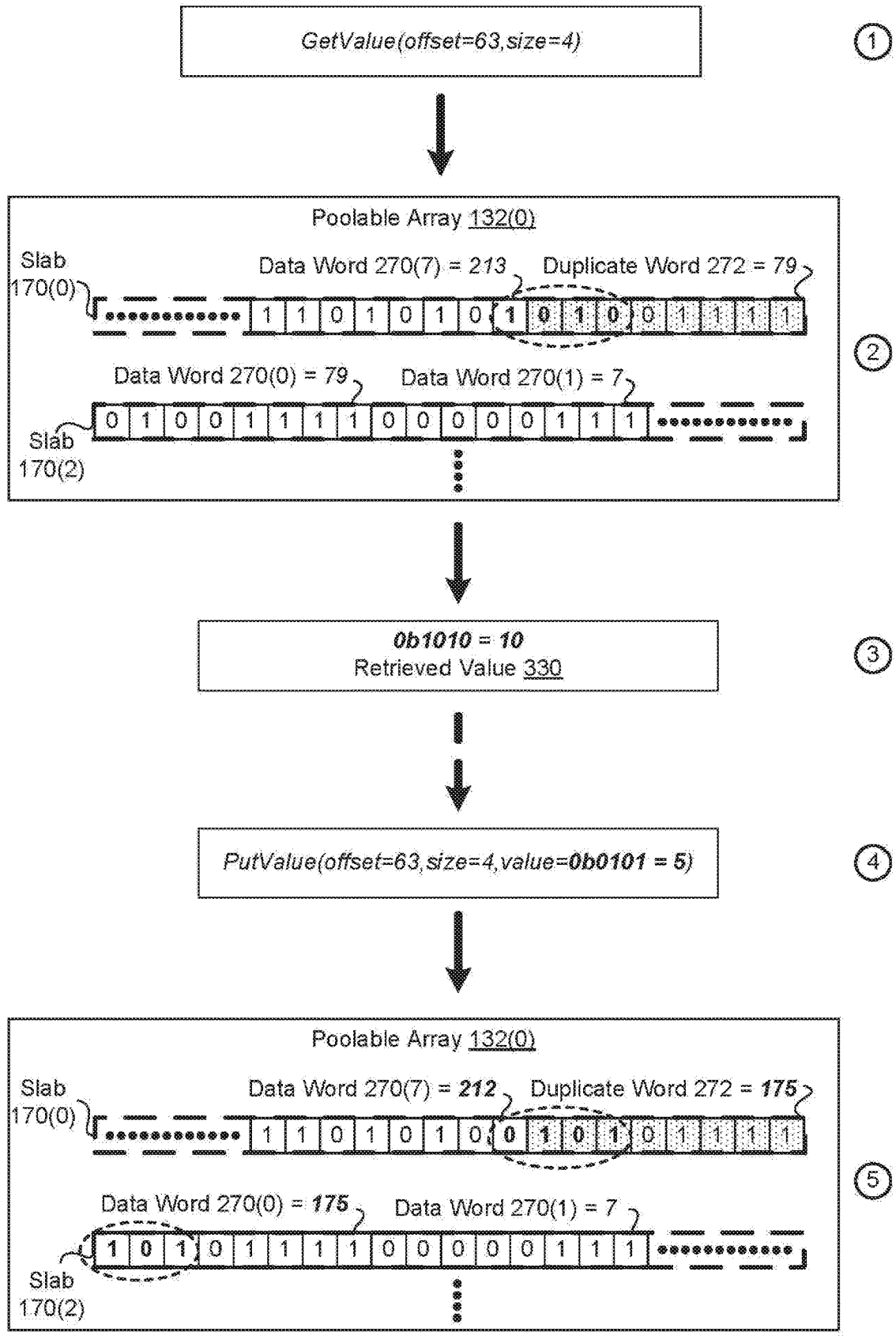
FIG. 3 illustrates a sequence of operations performed by the memory pool application when interfacing between the dataset application and the poolable array of FIG. 2, according to various embodiments of the present invention.

FIG. 3 illustrates a sequence of operations performed by the memory pool application 140 when interfacing between the dataset application 120 and the poolable array 132(0) of FIG. 2, according to various embodiments of the present invention. The sequence of operations involves reading a value from a specified offset within the poolable array 132(0) and subsequently writing a new value to the poolable array 132(0) starting at the specified offset. FIG. 3 depicts the sequence of operations as a series of numbered bubbles.

As depicted with the bubble numbered 1, the dataset application 120 invokes the interface method GetValue with a specified offset of 63 bits and a size of 4 bits for the poolable array 132(0). Accordingly, the memory pool application 140 performs a single unaligned read operation on the poolable array 132(0). As depicted with the bubble numbered 2, the specified offset corresponds to the final bit included in the data word 270(7) included in the slab 170(0). Consequently, the retrieved value 330 includes the final bit included in the data word 270(7) included in the slab 170(0). Further, the retrieved value 330 includes the first three bits that are stored in both the duplicate word 272 included in the slab 170(0) and the leading data word 270(0) included in the slab 170(2). Importantly, the duplicate word 272 included in the slab 170(0) enables the memory pool application 140 to retrieve the proper requested value via a single unaligned read operation. As depicted with the bubble numbered 3 the retrieved value 330 is equal to a binary value of 1010.

Subsequently, as depicted with the bubble numbered 4, the dataset application 120 invokes the interface method PutValue with a specified value of 0101, a specified offset of 63 bits, and a size of 4 bits on the poolable array 132(0). As depicted with the bubble numbered 5, the specified offset corresponds to the final bit included in the data word 270(7) included in the slab 170(0). Accordingly, after writing a 0 to the final bit included in the data word 270(7) included in the slab 170(0), the memory pool application 140 writes a binary value of 101 to the first three bits included in the data word 270(0) included in the slab 170(2). Finally, the memory pool application 140 copies the data word 270(0) included in the slab 170(2) to the duplicate word 272 included in the slab 170(0). The bits in the poolable array 132(0) that are modified during the two write operations are circled.

Figure 4:
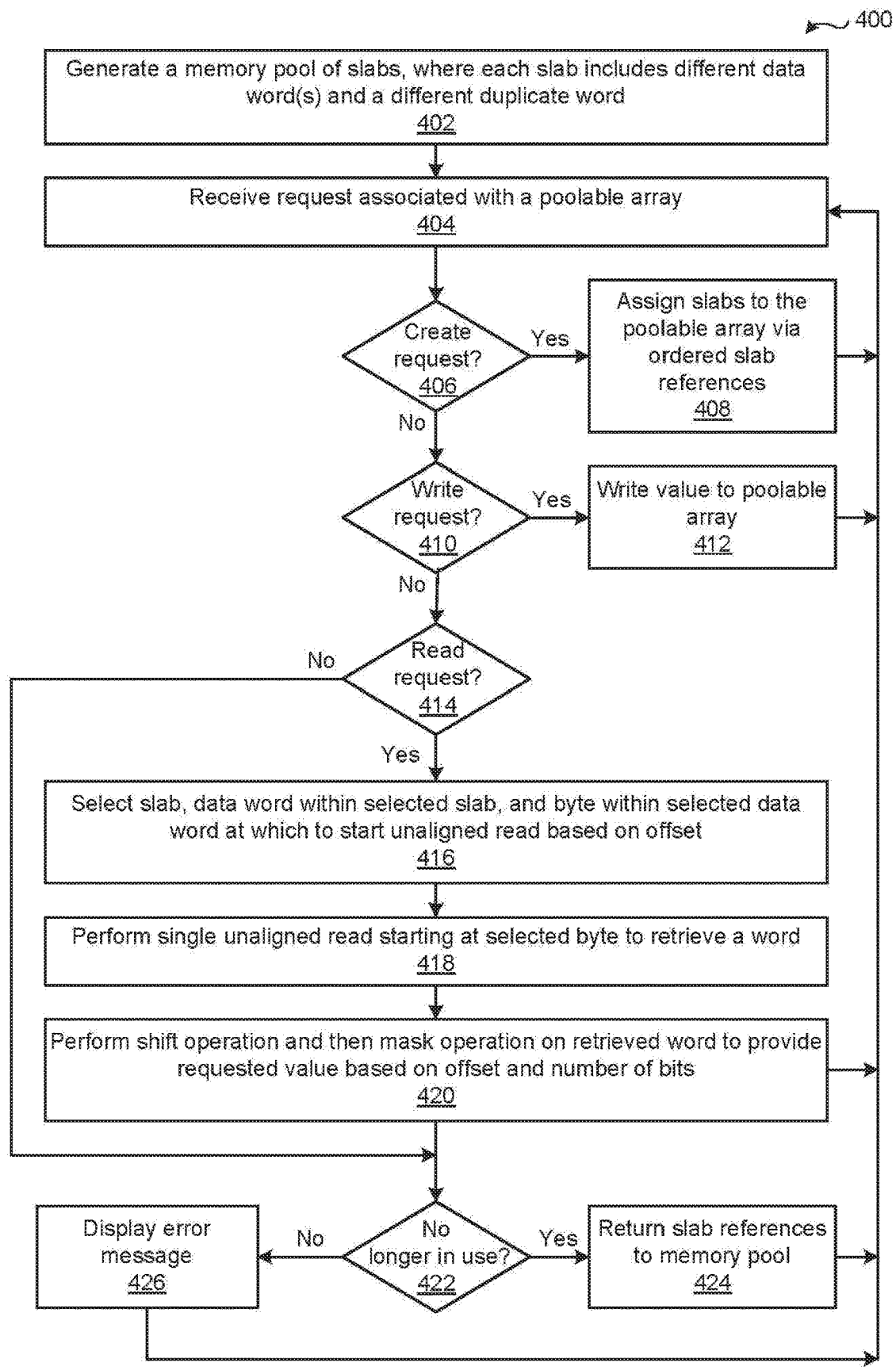
FIG. 4 is a flow diagram of method steps for performing one or more operations on poolable arrays, according to various embodiments of the present invention.

FIG. 4 is a flow diagram of method steps for performing one or more operations on poolable arrays, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the memory pool application 140 generates multiple fixed-sized slabs 170. Each of the slabs includes different data words 270 and a different duplicate word 272. The memory pool application 140 also generates the memory pool 160 and, for each of thegenerated slabs 170, assigns an associated slab reference 230 to the memory pool 160. The memory pool application 140 may determine the number and size of the slabs 170 in any technically feasible fashion. Further, each of the words (i.e., the data words 270 and the duplicate words 272) included in the slabs 170 include the same number of bits.

At step 404, the memory pool application 140 receives a request associated with a specified poolable array 132. The memory pool application 140 may receive the request in any technically feasible fashion. For instance, in some embodiments, the memory pool application 140 may receive the request via the memory pool application programming interface (API) 142.

At step 406, the memory pool application 140 determines whether the request is a request to create a new poolable array 132. If, at step 406, the memory pool application 140 determines that the request is a request to create a new poolable array 132, then the method 400 proceeds to step 408. At step 408, the memory pool application 140 generates a new poolable array 132 and identifies one or more slab references 230 based on a size specified in the request. For each of the identified slab references 230, the memory pool application 140 removes the slab reference 230 from the memory pool 160 and appends the slab reference 230 to the poolable array 132. The method 400 then returns to step 404 where the memory pool application 140 receives a new request.

If, however, at step 406, the memory pool application 140 determines that the request is not a request to create a new poolable array 132, then the method 400 proceeds directly to step 410. At step 410, the memory pool application 140 determines whether the request is a request to write a specified value to one of the poolable arrays 132. If, at step 410, the memory pool application 140 determines that the request is a request to write a specified value to one of the poolable arrays 132, then the method 400 proceeds to step 412.

At step 412, the memory pool application 140 writes the specified value to the poolable array 132 based on a number of bits specified via the request and an offset relative to the start of the poolable array 132, also specified via the request. The memory pool application 140 may write the specified value to the poolable array 132 in any technically feasible fashion that is consistent with the semantics of the data words 270 and the duplicate word 272. More precisely, for each of the slabs 270 assigned to the poolable array 132 except the final slab 170 assigned to the poolable array 132, the duplicate word 272 is a copy of the leading data word 270(0) included in the next slab 170 assigned to the poolable array 132. In some embodiments, the memory pool application 140 performs the method steps described in conjunction with FIG. 5 to write the specified value to the poolable array 132. The method 400 then returns to step 404 where the memory pool application 140 receives a new request.

If, however, at step 410, the memory pool application 140 determines that the request is not a request to write a specified value to one of the poolable arrays 132, then the method 400 proceeds directly to step 414. At step 414, the memory pool application 140 determines whether the request is a request to read a value from one of the poolable arrays 132. If, at step 414, the memory pool application 140 determines that the request is a request to read a value from one of the poolable arrays 132, then the method 400 proceeds to step 416.

At step 416, the memory pool application 140 selects the slab 170, the data word 270 within the selected slab 170, and the byte within selected data word 270 at which to start an unaligned read operation based on an offset relative to the start of the poolable array 132 associated with the request. At step 418, the memory pool application 140 performs a single unaligned read operation starting at the selected byte to retrieve a word. In general, the number of bits included in the retrieved word equals the number of bits in each of the data words 270. At step 420, the memory pool application 140 performs a shift operation on the retrieved word based on the specified offset to generate an offset word. Subsequently, the memory pool application 140 performs a mask operation on the offset word based on a number of bits specified via the request to provide the requested value. The method 400 then returns, to step 404 where the memory pool application 140 receives a new request.

Returning now to step 414, if the memory pool application 140 determines that the request is not a request to read a value from one of the poolable arrays 132, then the method 400 proceeds directly to step 422. At step 422, the memory pool application 140 determines whether the request indicates that one or the poolable arrays 132 is no longer in use. If, at step 422, the memory pool application 140 determines that the request indicates the one of the poolable arrays 132 is no longer in use, then the method 400 proceeds to step 424. At step 424, the memory pool application 140 moves each of the slab references 230 included in the specified poolable array 132 from the specified poolable array 132 to the memory pool 160. In this fashion, the slabs 270 referenced by the reclaimed slab references 230 are available for reuse as part of one or more new poolable arrays 132. The method 400 then returns to step 404 where the memory pool application 140 receives a new request.

If, however, at step 422, the memory pool application 140 determines that the request does not indicate that one of the poolable arrays 132 is no longer in use, then the memory pool application 140 proceeds directly to step 426. At step 426, the memory pool application 140 displays an error message and the method 400 returns to step 404 where the memory pool application 140 receives a new request. In alternate embodiments the memory pool application 140 may support any number and type of requests in any technically feasible fashion, and the method 400 may be modified accordingly.

Figure 5:
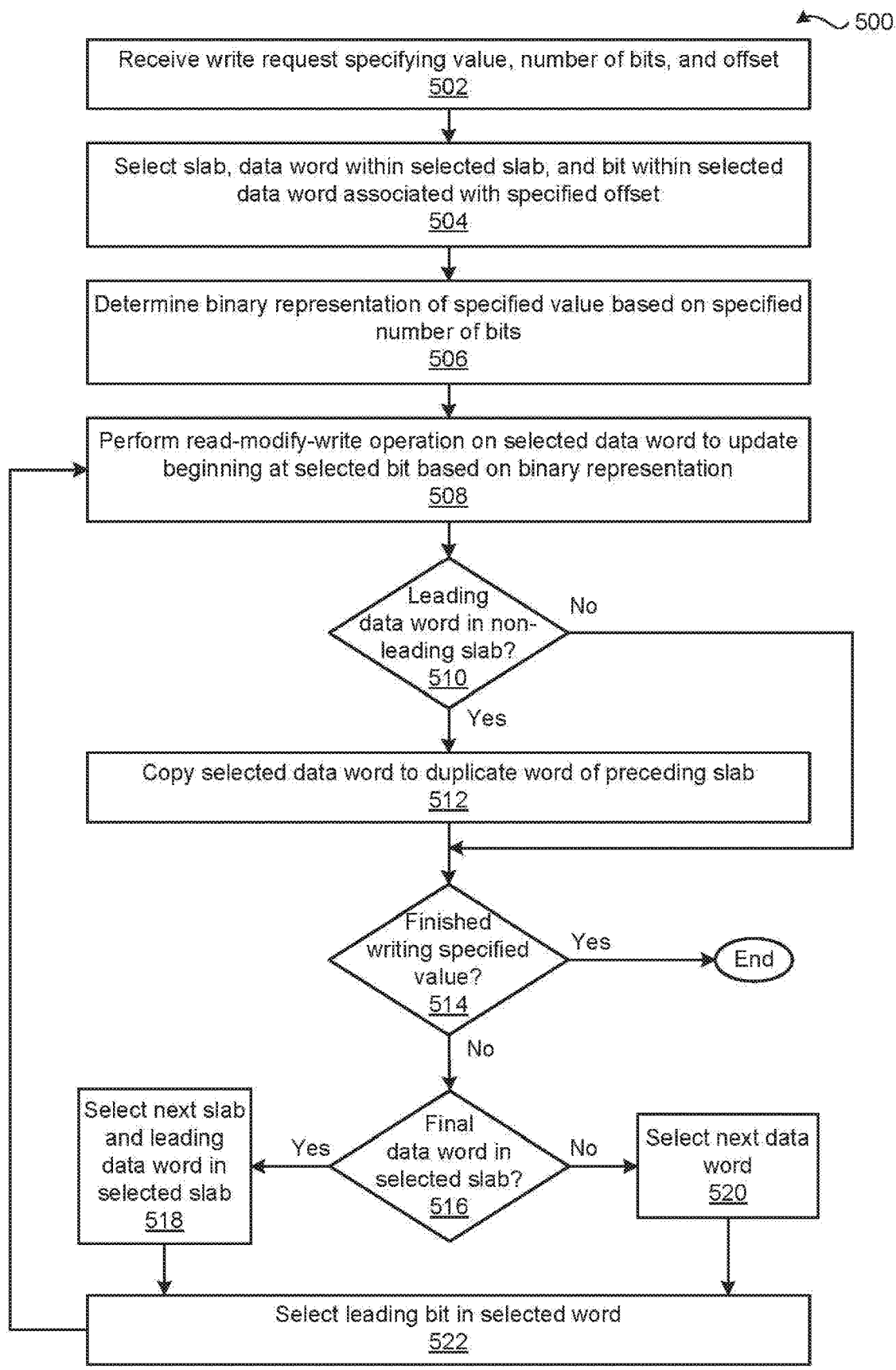
FIG. 5 is a flow diagram of method steps for storing a value in a poolable array, according to various embodiments of the present invention.

FIG. 5 is a flow diagram of method steps for storing a value in a poolable array, according to various embodiments of the present invention. Although the method steps are described with reference to the systems of FIGS. 1-3, persons skilled in the art will understand that any system configured to implement the method steps, in any order, falls within the scope of the present invention.

As shown, a method 500 begins at step 502, where the memory pool application 140 receives a write request specifying a value, a number of bits, and, an offset relative to the start of the poolable array 132 associated with the request. At step 504, the memory pool application 140 selects the slab 170, the data word 270 within the selected slab 170, and a bit within the selected data word 270 based on the specified offset. At step 506, the memory pool application 140 determines a binary representation of the specified value based on the number of bits. At step 508, the memory pool application 140 performs a read-modify-write operation on the selected data word 270 that writes at least a portion of a binary representation to the selected data word 270 starting at the selected bit.

At step 510, the memory pool application 140 determines whether the selected data word 270 is the leading data word 270 (i.e., the data word 270(0)) included in a non-leading slab 170. If, at step 510, the memory pool application 140 determines that the selected data word 270 is the leading data word 270 included in a non-leading slab 170, then the method 500 proceeds to step 512. At step 512, the memory pool application 140 copies the selected data word 270 to the duplicate word 272 included in the preceding slab 170.

If, however, at step 510, the memory pool application 140 determines that the selected data word 270 is not the leading data word 270 included in a non-leading slab 170, then the method 500 proceeds directly to step 514. At step 514, the memory pool application 140 determines whether the memory pool application 140 has finished writing the specified value to the poolable array 132. If, at step 514, the memory pool application 140 determines that the memory pool application 140 has finished writing the specified value to the poolable array 132, then the method 500 terminates.

If, however, at step 514, the memory pool application 140 determines that the memory pool application has not finished writing the specified value to the poolable array 132, then the method 500 proceeds to step 516. At step 516, the memory pool application 140 determines whether the selected data word 270 is the final data word 270 included in the selected slab 170. If, at step 516, the memory pool application 140 determines that the selected data word 270 is the final data word 270 included in the selected slab 170, then the method 500 proceeds to step 518. At step 518, the memory pool application 140 selects the next slab 170 included in the poolable array 132 and the leading data word 270(0) included in the selected slab 170. The method 500 then proceeds directly to step 522.

If, however, at step 516, the memory pool application 140 determines that the selected data word 270 is not the final data word 270 included in the selected slab 170, then the method 500 proceeds directly to step 520. At step 520, the memory pool application 140 selects the next data word 270 included in the selected slab 170. The method 500 then proceeds directly to step 522.

At step 522, the memory pool application 140 selects the leading bit in the selected data word 270. The method 500 then returns to step 508, where the memory pool application 140 performs a second read-modify-write operation that writes the remaining bits of the specified value to the poolable array 132.

Advantageously, by performing the method steps described in conjunction with FIGS. 4 and 5, the memory pool application 140 enables any number of applications, including the dataset application 120, to store values via poolable arrays 132 that are optimized for read-only operations. Notably, because the memory pool application 140 may generate poolable arrays 132 of different sizes based on the reusable slabs 270, the memory pool application 140 efficiently uses the heap memory 150. Further, the generational garbage collector 180 does not reclaim the memory allocated to the slabs 270 while the memory pool application 140 is executing.

In sum, the disclosed techniques may be used to efficiently implement datasets in computing environments that include generational garbage collectors. A system includes, without limitation, a memory pool application and a dataset application that execute on a server. As part of an initialization process, the memory pool application allocates multiple slabs and includes references to each of the slabs in a memory pool. Notably, for each slab, the memory pool application allocates a fixed number of data words and then appends a duplicate word. Subsequently, the dataset application interfaces with the memory pool application via a memory pool application programming interface (API) to generate and operate on any number of poolable arrays that store values included in the dataset.

In general, each poolable array includes, without limitation, a ordered list of references to slabs assigned to the poolable array. To generate a poolable array of a specified size, the memory pool application moves slab references included in the memory pool to the poolable array based on the specified size and the number of data words included in each slab. After a given poolable array is no longer in use, the memory pool application returns the slab references included in the poolable array to the memory pool.

To store a value in a specified number of bits starting at a specified offset within the poolable array, the memory pool application determines the target slab(s) and target data word(s) within the target slab(s) based on the specified offset and the specified number of bits. The memory pool application performs read-modify-write operations that update the target data words to store the value. If a target data word is the leading data word in a non-leading slab, then the memory pool application copies the target data word to the duplicate word in the preceding slab. To read a value stored in a specified number of bits starting at a specified offset within the poolable array, the memory pool application selects a slab, a data word within the selected slab, and a byte within the selected data word based on the specified offset. The memory pool application then performs an unaligned read of a word starting at the selected byte to retrieve a word. Finally, the data set application performs a shift operation on the retrieved word to generate an offset word, followed by a mask operation on the offset word to provide the requested value.

One advantage of the disclosed techniques is that storing values in slabs that are amenable to reuse via poolable arrays mitigates operational pauses attributable to garbage collection of heap memory that may reduce the ability of applications to respond to end-user requests. Further, the duplicate words ensure that latencies typically experienced while performing read-only operations on a value stored in two data words in different slabs are similar to latencies typically experienced while performing read-only operations on a value stored in two data words in a single slab. Finally, because the poolable arrays store bit-aligned representations of values, the total number of data words required to store the dataset is optimized.

1. In some embodiments, a method comprises assigning a first slab and a second slab to a composite array, wherein the first slab and the second slab are associated with a memory pool; modifying a final data word included in the first slab to store a first portion of a specified value; modifying a leading data word included in the second slab to store a second portion of the specified value; performing a copy operation that copies the leading word to a duplicate word included in the first slab; performing a first unaligned read operation on the first slab based on a specified offset to retrieve a first word stored in memory; and extracting the specified value from the first word based on a specified number of bits and the specified offset.

2. The method of clause 1, wherein a total number of data words included in each of the first slab and the second slab is based on a power of two.

3. The method of clauses 1 or 2, wherein extracting the specified value from the first word comprises performing a shift operation on the first word based on the specified offset to generate an offset word; and performing a mask operation on the offset word based on the specified number of bits to identify the specified value.

4. The method of any of clauses 1-3, wherein performing the first unaligned read operation on the first slab comprises identifying the final data word and a target byte included in the final data word based on the specified offset; and configuring an unaligned read operation to access a word stored in the memory that starts at the target byte in the final data word and ends within the duplicate word.

5. The method of any of clauses 1-4, wherein modifying the final data word comprises determining a binary representation of the specified value based on the specified number of bits; identifying the first slab, the final data word, and a start bit within the final data word based on the specified offset; and performing a read-modify-write operation on the final data word to store in the memory at least a first bit included in the binary representation.

6. The method of any of clauses 1-5, wherein modifying the leading data word comprises determining that one or more bits included in the binary representation are not stored in the final data word; and performing a read-modify-write operation on the leading data word to store in the memory the one or more bits as part of the leading data word 7. The method of any of clauses 1-6, wherein assigning the first slab and the second slab comprises removing a first reference to the first slab from the memory pool and appending the first reference to the composite array; and removing a second reference to the second slab from the memory pool and appending the second reference to the composite array.

8. The method of any of clauses 1-7, further comprising, prior to assigning the first slab and the second slab: dynamically allocating a plurality of slabs that includes the first slab and the second slab, wherein each slab included in the plurality of slabs includes one or more different data words and a different duplicate word; and generating the memory pool that includes a reference to each slab included in the plurality of slabs.

9. The method of any of clauses 1-8, wherein at least one of the final data word, the leading data word, and the duplicate word stores a multibyte value in a little-endian byte order.

10. In some embodiments, a computer-readable storage medium includes instructions that, when executed by a processor, cause the processor to perform the steps of assigning a first slab and a second slab to a composite array, wherein the first slab and the second slab are associated with a memory pool, and a size of the first slab is equal to a size of the second slab; modifying a final data word included in the first slab to store a first portion of a specified value; modifying a leading data word included in the second slab to store a second portion of the specified value; performing a copy operation that copies the leading word to a duplicate word included in the first slab; performing a first unaligned read operation on the first slab based on a specified offset to retrieve a first word stored in random access memory (RAM); and extracting the specified value from the first word based on a specified number of bits and the specified offset.

11. The computer-readable storage medium of clause 10, wherein extracting the specified value from the first word comprises performing a shift operation on the first word based on the specified offset to generate an offset word; and performing a mask operation on the offset word based on the specified number of bits to identify the specified value.

12. The computer-readable storage medium of clauses 10 or 11, wherein modifying the final data word comprises determining a binary representation of the specified value based on the specified number of bits; identifying the first slab, the final data word, and a start bit within the final data word based on the specified offset; and performing a read-modify-write operation on the final data word to store in the RAM at least a first bit included in the binary representation.

13. The computer-readable storage medium of any of clauses 10-12, wherein modifying the leading data word comprises determining that one or more bits included in the binary representation are not stored in the final data word; and performing a read-modify-write operation on the leading data word to store in the RAM the one or more bits as part of the leading data word 14. The computer-readable storage medium of any of clauses 10-13, wherein assigning the first slab and the second slab comprises removing a first reference to the first slab from the memory pool and appending the first reference to the composite array; and removing a second reference to the second slab from the memory pool and appending the second reference to the composite array.

15. The computer-readable storage medium of any of clauses 10-14, further comprising, prior to assigning the first slab and the second slab; dynamically allocating a plurality of slabs that includes the first slab and the second slab, wherein each slab included in the plurality of slabs includes one or more different data words and a different duplicate word; and generating the memory pool that includes a reference to each slab included in the plurality of slabs.

16. The computer-readable storage medium of any of clauses 10-15, further comprising determining that the composite array is no longer in use; and for each slab included in the plurality of slabs, removing the reference to the slab from the composite array and adding the reference to the slab to the memory pool.

17. The computer-readable storage medium of any of clauses 10-16, wherein at least one of the final data word, the leading data word, the duplicate word, and the first word includes eight bytes.

18. The computer-readable storage medium of any of clauses 10-17, wherein the specified value comprises a bit-aligned value.

19. In some embodiments, a system comprises a memory storing a memory pool application; and a processor coupled to the memory, wherein when executed by the processor, the memory pool application causes the processor to assign at least a first slab and a second slab to a composite array based on a total number of data words, wherein the first slab and the second slab are associated with a memory pool; modify a final data word included in the first slab to store a first portion of a specified value; modify a leading data word included in the second slab to store a second portion of the specified value; perform a copy operation that copies the leading word to a duplicate word included in the first slab; perform a first unaligned read operation on the first slab based on a specified offset to retrieve a first word stored in the memory, wherein the specified offset is associated with the composite array; and extract the specified value from the first word based on a specified number of bits and the specified offset.

20. The system of clause 19, wherein, prior to generating the composite array, the memory pool application further causes the processor to dynamically allocate a plurality of slabs that includes the first slab and the second slab, wherein each slab included in the plurality of slabs includes one or more different data words and a different duplicate word; and generate the memory pool that includes a reference to each slab included in the plurality of slabs.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system," Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   causing a first data word included in a first slab associated with a memory pool to store a first portion of a value;
   causing a second data word included in a second slab associated with the memory pool to store a second portion of the value, wherein the first portion of the value is not stored in the second slab; and
   performing a copy operation that copies the second data word to a duplicate data word included in the first slab.

2. The computer-implemented method of claim 1, further comprising:
   performing, based on a specified offset included in a first read request to retrieve the value, a first read operation on the first slab; and
   extracting, based on the specified offset and a specified number of bits, the value from the first data word and the duplicate data word, wherein the first read request includes the specified number of bits.

3. The computer-implemented method of claim 1, further comprising:
   identifying, based on a specified offset included in a first write request to store a data value, a first start bit within the first data word included in the first slab;
   determining, based on a specified number of bits, a binary representation of the data value, wherein the first write request includes the specified number of bits; and
   performing a first read-modify-write operation on the first data word to store in the first data word at least a first bit included in the binary representation of the data value.

4. The computer-implemented method of claim 3, further comprising:
   after performing the first read-modify-write operation on the first data word, determining that a set of bits included in the binary representation of the data value are not stored in the first data word;
   identifying a second start bit within the second data word included in the second slab; and
   performing a second read-modify-write operation on the second data word to store in the second data word the set of bits included in the binary representation of the data value.

5. The computer-implemented method of claim 1, further comprising:
   allocating a plurality of slabs that includes the first slab and the second slab, wherein each slab included in the plurality of slabs includes one or more different data words and a different duplicate word; and
   generating the memory pool that includes a reference to each slab included in the plurality of slabs;
   removing a first reference to the first slab from the memory pool;
   appending the first reference to a composite array;
   removing a second reference to the second slab from the memory pool; and
   appending the second reference to the composite array.

6. The computer-implemented method of claim 1, wherein the first slab, the second slab, and the memory pool are included in a heap memory.

7. The computer-implemented method of claim 1, further comprising:
   determining a set of references to a set of slabs included in a plurality of slabs allocated from memory, wherein the set of references is included in the memory pool;
   initializing a composite array, wherein a size of the composite array is based on the set of references; and
   moving each reference in the set of references from the memory pool to the composite array.

8. The computer-implemented method of claim 7, further comprising:
   determining that the composite array is no longer in use; and
   moving, from the composite array to the memory pool, each reference in the set of references.

9. The computer-implemented method of claim 1, wherein the first slab and the second slab are equal in size.

10. The computer-implemented method of claim 1, wherein at least one of the first data word, the second data word, or the duplicate data word stores a multi-byte value in one of a little-endian byte order or a big-endian byte order.

11. One or more non-transitory computer-readable media including instructions that, when executed by one or more processors, cause the one or more processors to perform the steps of:
   generating a first slab including a first plurality of data words, wherein the first slab is associated with a memory pool;
   generating a second slab including a second plurality of data words, wherein the second slab is associated with the memory pool;
   assigning the first slab and a second slab to a composite array;
   modifying a first data word included in the first plurality of data words to store a first portion of a value;
   modifying a second data word included in the second plurality of data words to store a second portion of the value, wherein the first portion of the value is not stored in the second slab; and
   performing a copy operation that copies the second data word to a duplicate word included in the first slab.

12. The one or more non-transitory computer-readable media of claim 11, further comprising:
   performing, based on a specified offset included in a first read request to retrieve the value, a first read operation on the first slab;
   performing, based on the specified offset, a shift operation on the first slab to generate an offset word; and
   performing, based on a specified number of bits, a mask operation on the offset word to identity a value, wherein the first read request includes the specified number of bits; and
   extracting the value from the offset word.

13. The one or more non-transitory computer-readable media of claim 11, wherein a total number of data words included in each of the first slab and the second slab is based on a power of two.

14. The one or more non-transitory computer-readable media of claim 11, wherein at least one of the first data word, the second data word, or the duplicate word includes eight bytes.

15. The one or more non-transitory computer-readable media of claim 11, wherein the value comprises a bit-aligned value.

16. The one or more non-transitory computer-readable media of claim 11, wherein the first slab, the second slab, and the memory pool are included in a heap memory.

17. The one or more non-transitory computer-readable media of claim 11, wherein the first slab and the second slab are equal in size.

18. The one or more non-transitory computer-readable media of claim 11, further comprising instructions that, when executed by the one or more processors, cause the one or more processors to perform the steps of:
   determining that the composite array is no longer in use; and
   moving a first reference corresponding to the first slab from the composite array to the memory pool; and
   moving a second reference corresponding to the second slab from the composite array to the memory pool.

19. The one or more non-transitory computer-readable media of claim 11, wherein at least one of the first data word, the second data word, or the duplicate word stores a multi-byte value in one of a little-endian byte order or a big-endian byte order.

20. A system, comprising:
   a memory storing a memory pool application; and
   a processor coupled to the memory, wherein when executed by the processor,
      the memory pool application causes the processor to:
      cause a first data word included in a first slab associated with a memory pool to store a first portion of a value;
      cause a second data word included in a second slab associated with the memory pool to store a second portion of the value, wherein the first portion of the value is not stored in the second slab; and
      perform a copy operation that copies the second data word to a duplicate word included in the first slab.

* * * * *